United States Patent
Tang et al.

(10) Patent No.: US 10,809,277 B2
(45) Date of Patent: Oct. 20, 2020

(54) SINGLE AXIS INERTIAL SENSOR WITH SUPPRESSED PARASITIC MODES

(71) Applicant: NXP USA, Inc., Austin, TX (US)

(72) Inventors: Jun Tang, Gilbert, AZ (US); Andrew C. McNeil, Chandler, AZ (US); Kajal Rahimian Kordestani, Scottsdale, AZ (US)

(73) Assignee: NXP USA, Inc., Austin, TX (US)

( * ) Notice: Subject to any disclaimer, the term of this patent is extended or adjusted under 35 U.S.C. 154(b) by 350 days.

(21) Appl. No.: 15/845,506

(22) Filed: Dec. 18, 2017

(65) Prior Publication Data

US 2019/0187169 A1 Jun. 20, 2019

(51) Int. Cl.
| | |
|---|---|
| *G01P 15/08* | (2006.01) |
| *G01C 19/5656* | (2012.01) |
| *G01P 15/13* | (2006.01) |
| *G01P 15/18* | (2013.01) |

(Continued)

(52) U.S. Cl.
CPC ...... *G01P 15/0802* (2013.01); *G01C 19/5656* (2013.01); *G01C 19/5755* (2013.01); *G01P 15/125* (2013.01); *G01P 15/13* (2013.01); *G01P 15/18* (2013.01); *G01P 2015/0837* (2013.01); *G01P 2015/0848* (2013.01)

(58) Field of Classification Search
CPC ...... G01P 15/0802; G01P 15/09; G01P 15/13; G01P 15/18; G01P 15/125; G01P 2015/0848; G01C 19/5656; G01C 19/5755
USPC .......................... 73/514.24, 514.01, 514.16, 73/514.26–514.35
See application file for complete search history.

(56) References Cited

U.S. PATENT DOCUMENTS

| | | |
|---|---|---|
| 7,258,011 B2 | 8/2007 | Nasiri et al. |
| 8,047,075 B2 | 11/2011 | Nasiri et al. |
| 8,372,677 B2 | 2/2013 | Mehregany |

(Continued)

FOREIGN PATENT DOCUMENTS

| | | |
|---|---|---|
| EP | 2315039 A1 | 4/2011 |
| EP | 2 887 073 A1 | 6/2015 |

(Continued)

OTHER PUBLICATIONS

Notice of Allowance; U.S. Appl. No. 15/469,754; 8 pages (dated Aug. 16, 2018).

(Continued)

*Primary Examiner* — Robert R Raevis
(74) *Attorney, Agent, or Firm* — Charlene R. Jacobsen

(57) ABSTRACT

A single axis inertial sensor includes a proof mass spaced apart from a surface of a substrate. The proof mass has first, second, third, and fourth sections. The third section diagonally opposes the first section relative to a center point of the proof mass and the fourth section diagonally opposes the second section relative to the center point. A first mass of the first and third sections is greater than a second mass of the second and fourth sections. A first lever structure is connected to the first and second sections, a second lever structure is connected to the second and third sections, a third lever structure is connected to the third and fourth sections, and a fourth lever structure is connected to the fourth and first sections. The lever structures enable translational motion of the proof mass in response to Z-axis linear acceleration forces imposed on the sensor.

20 Claims, 4 Drawing Sheets

(51) Int. Cl.
    *G01C 19/5755*    (2012.01)
    *G01P 15/125*     (2006.01)

(56) References Cited

U.S. PATENT DOCUMENTS

| | | | |
|---|---|---|---|
| 8,555,719 | B2 | 10/2013 | McNeil et al. |
| 8,739,626 | B2 | 6/2014 | Acar |
| 8,973,439 | B1 | 3/2015 | Baldasarre et al. |
| 8,978,475 | B2 | 3/2015 | Acar |
| 2003/0230143 | A1 | 12/2003 | Mahon |
| 2010/0071467 | A1 | 3/2010 | Nasiri et al. |
| 2016/0214853 | A1 | 7/2016 | Thompson et al. |
| 2016/0334315 | A1 | 11/2016 | Leroux et al. |
| 2017/0023608 | A1 | 1/2017 | Tang et al. |
| 2017/0234684 | A1* | 8/2017 | Coronato ........... G01C 19/5747 73/504.12 |
| 2018/0172446 | A1* | 6/2018 | Prikhodko ........... G01C 19/567 |

FOREIGN PATENT DOCUMENTS

| | | |
|---|---|---|
| EP | 3 121 605 A1 | 1/2017 |
| WO | WO-2013/116356 A1 | 8/2013 |

OTHER PUBLICATIONS

Non Final Office Action; U.S. Appl. No. 15/469,754; 18 pages (dated Feb. 21, 2019).
Qu, Hongwei, et al; "A Monolithic CMOS-MEMS 3-Axis Accelerometer With a Low-Noise, Low-Power Dual-Chopper Amplifier"; IEEE Sensors Journal, vol. 8, No. 9; pp. 1511-1518 (Sep. 2008).
U.S. Appl. No. 15/469,754; not yet published; 27 pages (filed Mar. 27, 2017).

\* cited by examiner

SINGLE AXIS INERTIAL SENSOR WITH SUPPRESSED PARASITIC MODES

TECHNICAL FIELD OF THE INVENTION

The present invention relates generally to inertial sensor devices. More specifically, the present invention relates to a microelectromechanical system (MEMS) inertial sensor device for detecting Z-axis linear acceleration force.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of inertial sensor devices (e.g., accelerometers, gyroscopes, and so forth). MEMS inertial sensors are widely used in applications such as automotive, inertial guidance systems, household appliances, game devices, protection systems for a variety of devices, and many other industrial, scientific, and engineering systems.

One type of MEMS Z-axis accelerometer sensor uses a proof mass that is configured in a "teeter-totter," "see-saw," or "tilt mode" configuration, in which the proof mass is supported from a substrate such that the proof mass rotates relative to the substrate under Z-axis acceleration perpendicular to the surface of the substrate. Sense electrodes placed below (e.g., on the underlying substrate), above, or both above and below the proof mass, which may be capacitively coupled with the proof mass, are used to sense such rotation of the proof mass and thereby to sense Z-axis acceleration. Such Z-axis teeter-totter accelerometer sensors may suffer from limited sensitivity due to a non-constant gap width change resulting from the teeter-totter motion.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns microelectromechanical systems (MEMS) inertial sensors with enhanced suppression of parasitic modes, and therefore enhanced sensitivity. More particularly, embodiments entail MEMS accelerometer devices capable of sensing acceleration forces along the Z-axis while suppressing parasitic lateral modes. In general, embodiments described herein provide differential sensing with enhanced sensitivity by the use of multiple lever structures connected to the proof mass that enable translational motion of the proof mass in response to acceleration along the Z-axis while largely limiting motion in the lateral directions along the X- and Y-axes (i.e., the lateral parasitic modes) to effectively enhance sensor sensitivity and thereby reduce noise and increase resistance to electromagnetic interference. Further, a translational motion based approach, as opposed to prior rotational or teeter-totter motion based approaches, can yield improvements in device performance such as better linearity, better thermal coefficient of offset (TCO) stability, optimization of sense electrode locations for package stress at various temperatures, and enhanced restoring force to substantially limit stiction related malfunctions.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
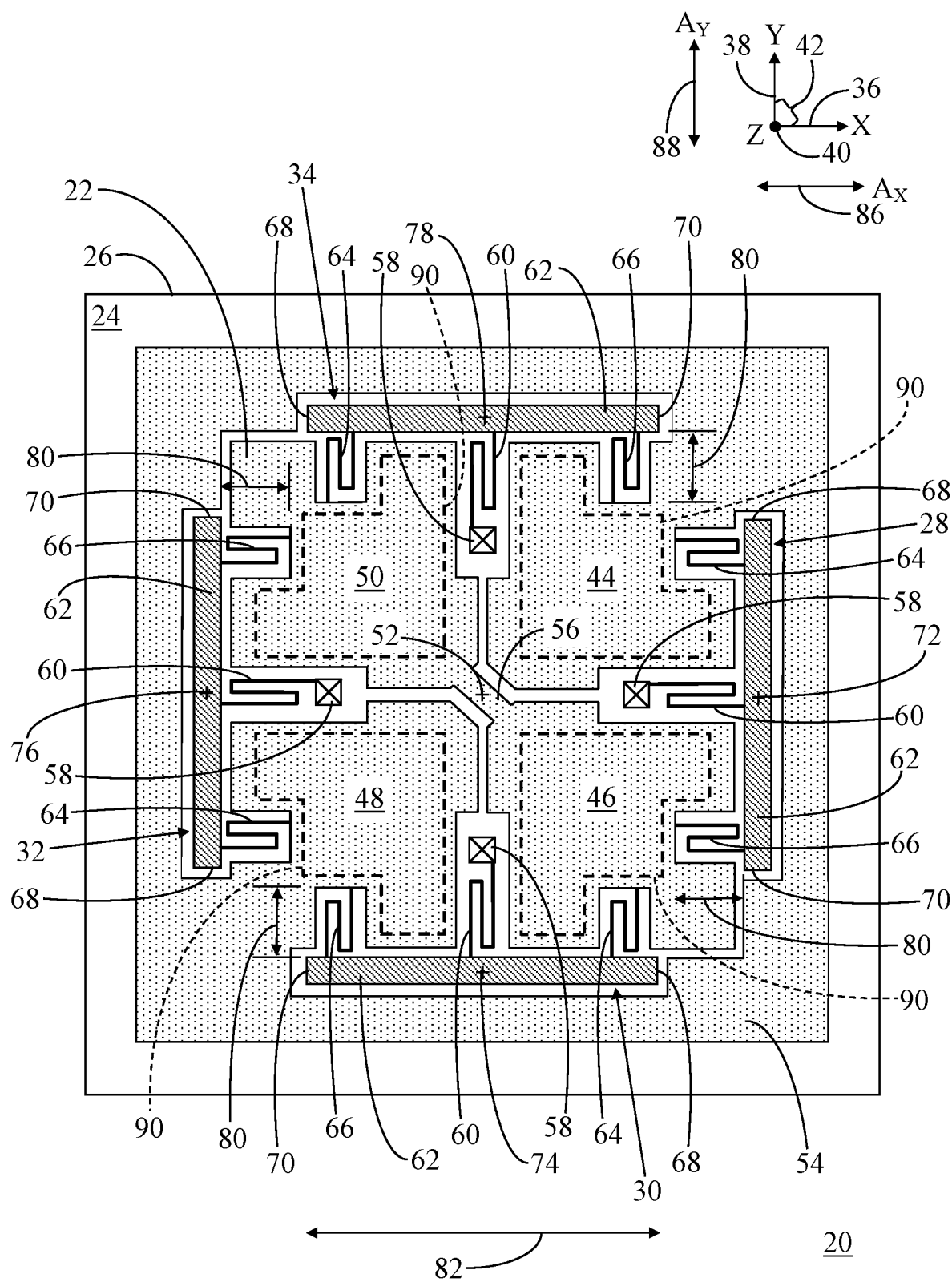
FIG. 1 shows a top view of a microelectromechanical systems (MEMS) inertial sensor in accordance with an embodiment.

Referring to FIG. 1, FIG. 1 shows a top view of a microelectromechanical systems (MEMS) inertial sensor 20 in accordance with an embodiment. MEMS inertial sensor 20 generally includes a proof mass system, more succinctly referred to herein as a proof mass 22, spaced apart from a planar surface 24 of a substrate 26. First, second, third, and fourth lever structures 28, 30, 32, 34, respectively, are interconnected between proof mass 22 and planar surface 24 of substrate 26. In general, first, second, third, and fourth lever structures 28, 30, 32, 34 are configured to movably couple proof mass 22 to planar surface 24 of a substrate 26.

In the top view illustration of FIG. 1, a three-dimensional coordinate system is represented in which an X-axis 36 is directed rightward and leftward on the page, a Y-axis 38 is directed upward and downward on the page, and a Z-axis 40 is directed into and out of the page. Together, X-axis 36 and Y-axis 38 define an X-Y plane 42, and surface 24 of substrate 26 is generally parallel to X-Y plane 42.

Proof mass 22 has a first section 44, a second section 46, a third section 48, and a fourth section 50. First, second, third, and fourth sections 44, 46, 48, 50 are positioned to surround a center point 52 of proof mass 22 such that third section 48 diagonally opposes first section 44 relative to center point 52, and fourth section 50 diagonally opposes second section 46 relative to center point 52.

A frame member 54, spaced apart from planar surface 24 of substrate 26, surrounds proof mass 22. First and third sections 44, 48 are directly attached to frame member 54, and second and fourth sections 46, 50 are detached from frame member 54. However, a rigid beam 56 (that is also spaced apart from planar surface 24 of substrate 26) interconnects second and fourth sections 46, 50. Proof mass 22 (including first, second, third, and fourth sections 44, 46, 48, 50), frame member 54, and rigid beam 56, are all depicted with a light stippled pattern to distinguish them from other features of inertial sensor 20 and to more clearly illustrate the interconnection of certain features.

First, second, third, and fourth lever structures 28, 30, 32, 34 are interposed between proof mass 22 and frame member 54. Further, first and third lever structures 28, 32 reside across from one another relative to proof mass 22. Likewise, second and fourth lever structures 30, 34 reside across from one another relative to proof mass 22. Thus, the four lever structures 28, 30, 32, 34 fully surround proof mass 22.

Each of first, second, third, and fourth lever structures 28, 30, 32, 34 includes an anchor 58, a first spring element 60, a rigid pivot beam 62, a second spring element 64, and a third spring element 66. The term "rigid" in rigid pivot beam 62 indicates that pivot beam 62 is significantly less flexible than first, second, and third spring elements 60, 64, 66 that are connected to it. Rigid pivot beam 62 has a first beam end 68 end and a second beam end 70. First spring element 60 of first lever structure 28 interconnects its anchor 58 and a midpoint 72 of its rigid pivot beam 62. Likewise, first spring element 60 of second lever structure 30 interconnects its anchor 58 and a midpoint 74 of its rigid pivot beam 62. First spring element 60 of third lever structure 32 interconnects its anchor 58 and a midpoint 76 of its rigid pivot beam 62. First spring element 60 of fourth lever structure 34 interconnects its anchor 58 and a midpoint 78 of its rigid pivot beam 62. Each of midpoints 72, 74, 76, 78 is centered between first and second beam ends 68, 70 of its corresponding rigid pivot beam 62. Rigid pivot beam 62 of each of first, second, third, and fourth lever structures 28, 30, 32, 34 is depicted with hatching to clearly distinguish it from the stippled proof mass 22, frame member 54, and rigid beam 56. However, as mentioned above, although different shading and/or hatching is utilized in the illustrations, the different elements within the structural layers may be formed out of the same material.

For first lever structure 28, second spring element 64 is interconnected between first beam end 68 of rigid pivot beam 62 and first section 44 of proof mass 22, and third spring element 66 is interconnected between second beam end 70 of rigid pivot beam 62 and second section 46 of proof mass 22. For second lever structure 30, second spring element 64 is interconnected between first beam end 68 of rigid pivot beam 62 and second section 46 of proof mass 22, and third spring element 66 is interconnected between second beam end 70 of rigid pivot beam 62 and third section 48 of proof mass 22. For third lever structure 32, second spring element 64 is interconnected between first beam end 68 of rigid pivot beam 62 and third section 48 of proof mass 22, and third spring element 66 is interconnected between second beam end 70 of rigid pivot beam 62 and fourth section 50 of proof mass 22. For fourth lever structure 34, second spring element 64 is interconnected between first beam end 68 of rigid pivot beam 62 and fourth section 50 of proof mass 22, and third spring element 66 is interconnected between second beam end 70 of rigid pivot beam 62 and first section 44 of proof mass 22.

Each of first, second, third, and fourth lever structures 28, 30, 32, 34 is oriented substantially parallel to planar surface 24 of substrate 26. Additionally, longitudinal dimensions 80 of first, second, and third spring elements 60, 64, 66 are oriented substantially parallel to on another. However, a longitudinal dimension 82 of rigid pivot beam 62 is oriented substantially perpendicular to longitudinal dimensions 80 of first, second, and third spring elements 60, 64, 66.

In accordance with an embodiment, first, second, and third spring elements 60, 64, 66 are folded spring elements. Additionally, first, second, and third spring elements 60, 64, 66 are torsion springs that are configured to pivot about an axis that is substantially parallel to planar surface 24 of substrate 26. Thus, first, second, and third spring elements 60, 64, 66 may be referred to herein as folded torsion springs. In this example, longitudinal dimensions 80 of first, second, and third spring elements 60, 64, 66 of first and third lever structures 28, 32 are substantially parallel to X-axis 36. Thus, pivot beams 62 of first and third lever structures 28, 32 are configured to pivot about X-axis 36. Conversely, longitudinal dimensions 80 of first, second, and third spring elements 60, 64, 66 of second and fourth lever structures 30, 34 are substantially parallel to Y-axis 38. Thus, pivot beams 62 of second and fourth lever structures 30, 34 are configured to pivot about Y-axis 38.

The configuration of first, second, third, and fourth lever structures 28, 30, 32, 34 causes lever structures 28, 30, 32, 34 to function cooperatively to enable translational motion of first, second, third, and fourth sections 44, 46, 48, 50 of proof mass 22 in response to a linear acceleration force, $A_Z$, 84 (see FIG. 4) imposed on inertial sensor 20 in a direction perpendicular to planar surface 24 of substrate 26, and therefore parallel to Z-axis 40. However, first, second, third, and fourth lever structures 28, 30, 32, 34 are further configured to substantially prevent translational motion of first, second, third, and fourth sections 44, 46, 48, 50 of proof mass 22 in response to additional linear acceleration forces 86, 88 imposed on inertial sensor 20 in one or more directions parallel to planar surface 24 of substrate 26. Linear acceleration forces 86, 88, labeled $A_x$ and $A_y$, are considered parasitic in a single Z-axis sensor configuration because they can adversely affect noise performance and sensor sensitivity in a single Z-axis inertial sensor design. By preventing or substantially limiting translational motion of first, second, third, and fourth sections 44, 46, 48, 50 of proof mass 22 in response to parasitic linear acceleration forces 86, 88, any signal noise that might be imposed on the output of inertial sensor 20 due to parasitic linear acceleration forces 86, 88 is effectively suppressed.

The translational motion in response to linear acceleration force 84 imposed on inertial sensor 20 can be detected as a change in capacitance between certain electrodes. Thus, inertial sensor 20 include fixed electrodes 90 underlying each of first, second, third, and fourth sections 44, 46, 48, 50 of proof mass 22. In the top view of FIG. 1, fixed electrodes 90 are shown in dashed line form since they are obscured from view by first, second, third, and fourth sections 44, 46, 48, 50 of proof mass 22. Fixed electrodes 90 are used to detect linear acceleration force 84 (FIG. 4) parallel to Z-axis 40 as a change in capacitance between proof mass 22 and fixed electrodes 90.

Proof mass 22, including first, second, third, and fourth sections 44, 46, 48, 50, is represented in greatly simplified form. It should be understood, however, that proof mass 22 can encompass a great variety of shapes and configurations, and more than the four sections shown. Further, a generalization of fixed electrodes 90 is shown for simplicity of illustration. Those skilled in the art will recognize that the configuration the fixed electrodes can vary in accordance with a particular design to, for example, optimize their location and sensitivity to linear acceleration force 84.

By virtue of their attachment to frame member 54, first and third sections 44, 48 of proof mass 22 effectively have greater mass than second and fourth sections 46, 50 of proof mass 22. The differing mass of first and third sections 44, 48 relative to second and fourth sections 46, 50 causes first and third sections 44, 48 to undergo translational motion responsive to linear acceleration force 84 (FIG. 4) in anti-phase with second and fourth sections 46, 50 of proof mass 22. Further the shape of frame member 54 may differ from that shown herein to increase the relative mass of first and third sections 44, 48 over second and fourth sections 46, 50. In other embodiments, first and third sections 44, 48 may be fabricated with relatively fewer etch holes than second and fourth sections 46, 50 in order to increase the difference in mass between first and third sections 44, 48 relative to second and fourth sections 46, 50. The lower density of etch holes extending through first and third sections 44, 48 relative to the higher density of etch holes extending through second and fourth sections 46, 50 results in first and third sections 44, 48 having a greater mass than second and fourth sections 46, 50.

Two examples for creating a system in which first and third sections 44, 48 of proof mass 22 have greater mass than second and fourth sections 46, 50 have been described herein. Those skilled in the art will recognize that other techniques may be implemented to yield the greater mass of first and third sections 44, 48 relative to second and fourth sections 46, 50. The mass difference between first and third sections 44, 48 and second and fourth sections 46, 50 is critical for achieving the anti-phase sensing along Z-axis 40.

Figure 2:
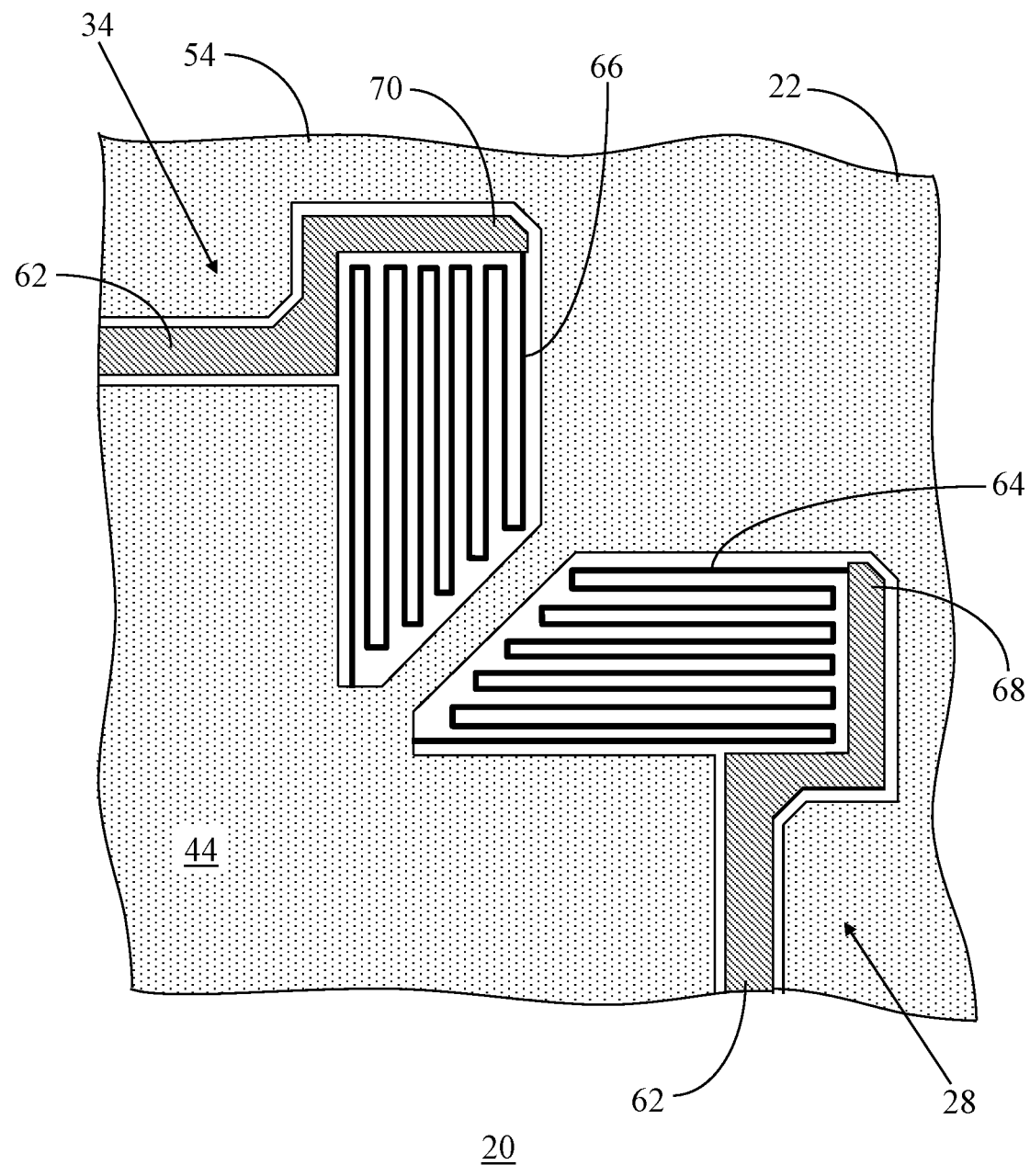
FIG. 2 shows an enlarged partial top view of the MEMS inertial sensor of FIG. 1.

FIG. 2 shows an enlarged partial top view of the MEMS inertial sensor 20. In particular, FIG. 2 shows a portion of first section 44 of proof mass 22 and frame member 54. FIG. 2 further shows a portion of first lever structure 28, including second spring element 64 at first beam end 68 of rigid pivot beam 62, and a portion of fourth lever structure 34, including third spring element 66 at second beam end 70 of its rigid pivot beam 62. FIG. 2 demonstrates a configuration for the second and third folded torsion spring elements 64, 66 that may be implemented within inertial sensor 20 to achieve a compact design. In FIG. 2, second and third folded torsion spring elements 64, 66 each have eleven folds. The concept drawing of FIG. 1 shows first, second, and third folded torsion spring elements 60, 64, 66 each having three folds for simplicity. It should be understood that first, second, and third folded torsion spring elements 60, 64, 66 may have any number of folds for achieving compact design and a desired torsional stiffness.

Figure 3:
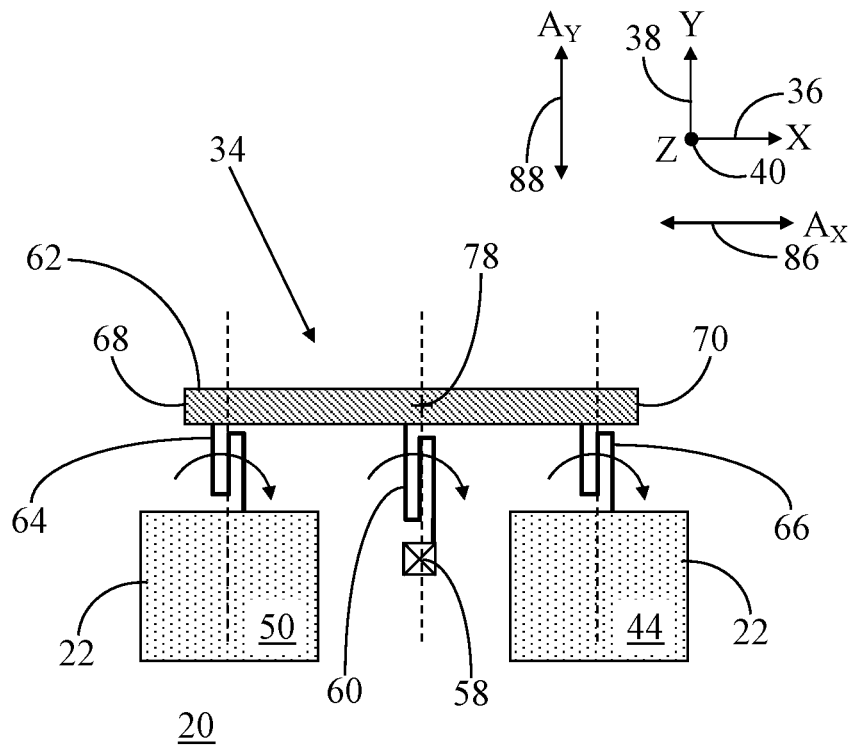
FIG. 3 shows a conceptual top view of a lever structure of the MEMS inertial sensor.
Figure 4:
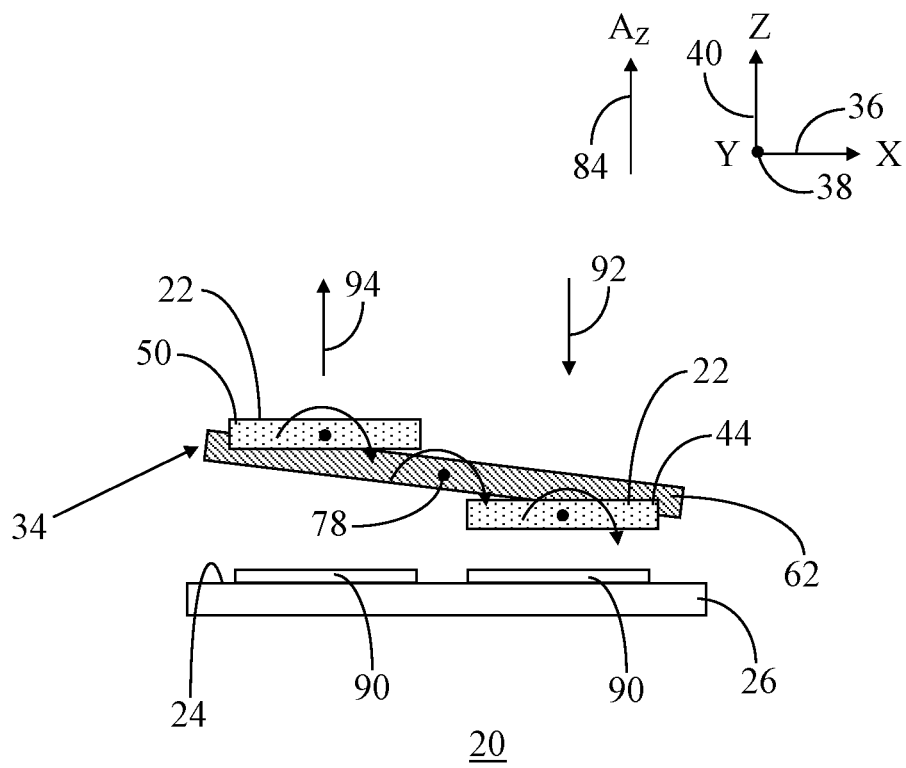
FIG. 4 shows a conceptual side view of the lever structure of FIG. 3.

Referring now to FIGS. 3 and 4, FIG. 3 shows a conceptual top view of a lever structure of inertial sensor 20 and FIG. 4 shows a conceptual side view of the lever structure of FIG. 3. In order to maintain consistent orientation of the views relative to FIG. 1, FIGS. 3 and 4 depict fourth lever structure 34. Thus, first spring element 60 of fourth lever structure 34 is interconnected between anchor 58 and midpoint 78 of its rigid pivot beam 62. Additionally, second spring element 64 is interconnected between first beam end 68 of rigid pivot beam 62 and fourth section 50 of proof mass 22, and third spring element 66 is interconnected between second beam end 70 of rigid pivot beam 62 and first section 44 of proof mass 22.

When MEMS inertial sensor 20 is subjected to acceleration force 84, $A_Z$, perpendicular to surface 24 of substrate 26, acceleration force 84 causes translational motion of first and fourth sections 44, 50 of proof mass 22 in a direction parallel to Z-axis 40. However, the heavier first section 44 moves in anti-phase relative to the lighter fourth section 50. The anti-phase translation motion is denoted in FIG. 4 by arrows 92, 94.

More particularly, in response to acceleration force 84, first torsion spring element 60 suitably flexes to enable the relatively rigid pivot beam 62 of fourth level structure 34 to pivot about Y-axis 38 at its midpoint 78. Further, second and third torsion spring elements 64, 66 suitably flex in response to the differing masses of first and fourth sections 44, 50 of proof mass 22 to yield the anti-phase translational motion 92, 94 of proof mass 22. In this example, acceleration force 84 is in a positive direction relative to Z-axis 40. Thus, the heavier first section 44 will undergo translational motion 92 in the opposite direction of acceleration force 84 and the lighter fourth section 50 will undergo translational motion 94 in the same direction as acceleration force 84.

The motion of first and fourth sections 44, 50 of proof mass 22 shown in FIG. 4 is provided to demonstrate the pivot capability of rigid pivot beam 62 and the resulting anti-phase movement of first and fourth sections 44, 50 in response to linear acceleration force 84. It should be understood, however, that the motion of first and fourth sections 44, 50 of proof mass 22 shown in FIG. 4 is achieved in the system of FIG. 1 that includes first, second, third, and fourth sections 44, 46, 48, 50 of proof mass 22 interconnected by first, second, third, and fourth lever structures 28, 30, 32, 34 as described above.

Figure 5:
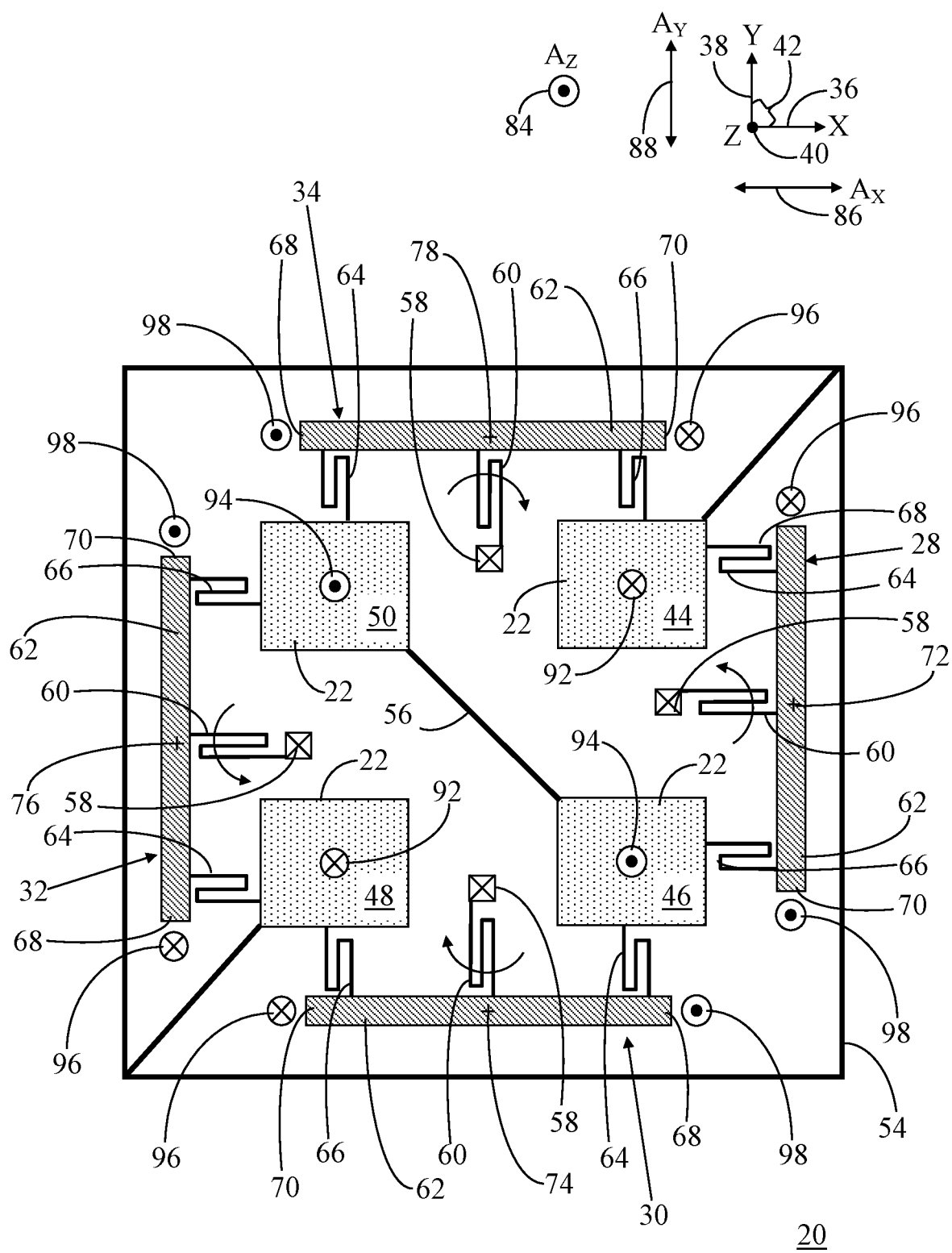
FIG. 5 shows, in a simplified and representative form, a top view of the MEMS inertial sensor demonstrating translational motion of the sections of the proof mass.

FIG. 5 shows, in a simplified and representative form, a top view of MEMS inertial sensor 20 demonstrating translational motion of first, second, third, and fourth sections 44, 46, 48, 50 of proof mass 22 in response to linear acceleration force 84 along Z-axis 40. In particular, first, second, third, and fourth lever structures 28, 30, 32, 34 function cooperatively to enable translational motion 92, 94 of first, second, third, and fourth sections 44, 46, 48, 50 in response to linear acceleration force 84 imposed on inertial sensor 20 along Z-axis 40, perpendicular to planar surface 24 (FIG. 1) of substrate 26 (FIG. 1).

In the illustration of FIG. 5, first, second, third, and fourth sections 44, 46, 48, 50 of proof mass 22 are represented by simple rectangles for simplicity. Likewise, frame member 54 and rigid beam 56 are represented by heavy lines for simplicity. In addition, linear acceleration force 84 is represented by an encircled dot, thereby indicating its direction out of the page upon which FIG. 5 is drawn. Similarly, translational motion 94 of second and fourth sections 46, 50 of proof mass 22 is represented by an encircled dot, thereby indicating the direction of translational motion 94 out of the page. Conversely, translational motion 92 of first and third sections 44, 48 of proof mass 22 is represented by and encircled "X", thereby indicating the direction of translational motion 92 into the page upon which FIG. 5 is drawn.

In response to acceleration force 84, the relatively rigid pivot beam 62 of each of first, second, third, and fourth lever structures 28, 30, 32, 34 pivots about its associated midpoint 72, 74, 76, 78. Thus, each pivot beam 62 moves in a teeter-totter motion. The teeter-totter motion of each pivot beam 62 is also demonstrated variously by an encircled dot or by an encircled "X."

In this example, acceleration force 84 imposed on inertial sensor 20 in the positive direction relative to Z-axis 40 causes first and third sections 44, 48 to undergo translational motion 92 in the opposite direction of acceleration force 84. By virtue of their connection to first section 44, first beam end 68 of pivot beam 62 of first lever structure 28 and second beam end 70 of pivot beam 62 of fourth lever structure 34 will undergo tilting motion 96 into the page, denoted by an encircled "X." Likewise, by virtue of their connection to third section 48, second beam end 70 of pivot beam 62 of second lever structure 30 and first beam end 68 of pivot beam 62 of third lever structure 32 will undergo tilting motion 96 into the page, denoted by an encircled "X."

This tilting motion 96 causes the other ends of the rigid pivot beams 62 to undergo tilting motion 98 in the opposite direction to yield the anti-phase movement of first and third sections 44, 48 relative to second and fourth sections 46, 50. Thus, by virtue of their connection to second section 46, second beam end 70 of pivot beam 62 of first lever structure 28 and first beam end 68 of pivot beam 62 of second lever structure 30 will undergo tilting motion 98 out of the page, denoted by an encircled dot. Further, by virtue of their connection to fourth section 50, second beam end 70 of pivot beam 62 of third lever structure 32 and first beam end 68 of pivot beam 62 of fourth lever structure 34 will also undergo tilting motion 98 out of the page, denoted by an encircled dot.

The anti-phase motion of first and third sections 44, 48 of proof mass 22 relative to second and fourth sections 46, 50 of proof mass 22 yields a fully differential inertial sensor design for enhanced sensitivity. Further, the anti-phase translational motion 92, 94 of first, second, third, and fourth sections 44, 46, 48, 50 of proof mass 22 yields uniform displacement of sections 44, 46, 48, 50 (i.e., a nearly constant gap change between the sections 44, 46, 48, 50 and the underlying fixed electrodes 90 shown in FIG. 1)). The uniform displacement may produce greater sensitivity, better linearity, and better temperature coefficient of offset (TCO) stability than a conventional teeter-totter design. The greater sensitivity yields less gain and less noise, and makes the inertial sensor more resistant to electromagnetic interference (EMI). Additionally, the uniform displacement of proof mass 22 enables greater design choices for the placement of sense electrodes so that sense electrode locations may be optimized for package stress at various temperatures.

The implementation of the four lever structures 28, 30, 32, 34 provides stable operation and therefore suppresses parasitic modes, i.e., translational motion due to parasitic linear acceleration 86 and/or 88 (FIG. 1) in the lateral directions. The flexures, in the form of the compact folded torsion springs, enable the use of the four lever structures 28, 30, 32, 34 in a small form factor. Accordingly, the four lever structures 28, 30, 32, 34 may be implemented in applications that require high-accuracy Z-axis sensors, such as in automotive applications.

Still further, a drawback of a prior art rotational based sensing approach is that it may provide a lower restoring force compared to that of the translational based sensing approach described herein. A restoring force represents the magnitude of force that pulls back the proof mass when it contacts a substrate. The restoring force can be determined by multiplying the travel distance and the spring constant. In a teeter totter accelerometer configuration, the sensing portion of the proof mass above the sense electrodes undergoes a relatively small displacement, i.e., travel distance, until the heavy end touches the underlying substrate. For the translational motion based sensing approach, the entire proof mass remains substantially parallel to the planar surface of substrate. That is, the travel distance is equivalent to the gap width over a large surface area of the proof mass. When considering a similar spring constant for a similar sensitivity, a rotational based sensing approach provides a lower restoring force then the translational motion based sensing approach because the travel distance for the heavy end is smaller than the gap width, i.e., the travel distance of a proof mass subject to pure translational motion. A lower restoring force increases the possibility of the proof mass sticking to the substrate (i.e., stiction). Thus, the relatively greater restoring force of the pure translational motion sensing approach may decrease the potential for stiction.

Embodiments described herein entail microelectromechanical systems (MEMS) inertial sensors, such as linear accelerometers. An embodiment of an inertial sensor comprises a proof mass spaced apart from a planar surface of a substrate, the proof mass having a first section, a second section, a third section and a fourth section, the third section diagonally opposing the first section relative to a center point of the proof mass, the fourth section diagonally opposing the second section relative to the center point of the proof mass, each of the first and third sections having a first mass, and each of the second and fourth sections having a second mass, the first mass being greater than the second mass. The inertial sensor further comprises a first lever structure connected to each of the first and second sections, a second lever structure connected to each of the second and third sections, a third lever structure connected to each of the third and fourth sections, and a fourth lever structure connected to each of the fourth and first sections, wherein the first, second, third, and fourth lever structures are configured to function cooperatively to enable translational motion of the first, second, third, and fourth sections of the proof mass in response to a linear acceleration force imposed on the inertial sensor in a direction perpendicular to the planar surface.

The MEMS inertial sensor configurations enable the sensing of linear acceleration forces along the Z-axis, perpendicular to the surface of the substrate, while suppressing parasitic lateral modes. The inertial sensor configurations yield differential sensing by the use of multiple lever structures connected to the proof mass that produce translational motion of the proof mass in response to acceleration along the Z-axis while largely limiting motion in the lateral directions along the X- and Y-axes (i.e., the lateral parasitic modes) to effectively enhance sensor sensitivity and thereby reduce noise and increase resistance to electromagnetic interference. Further, a translational motion based approach, as opposed to prior rotational or teeter-totter motion based approaches, can yield improvements in device performance such as better linearity, better TCO stability, optimization of sense electrode locations for package stress at various temperatures, and enhanced restoring force to substantially limit stiction related malfunctions.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An inertial sensor comprising:
a proof mass system spaced apart from a planar surface of a substrate, the proof mass system having a first section, a second section, a third section and a fourth section, the third section diagonally opposing the first section relative to a center point of the proof mass system, the fourth section diagonally opposing the second section relative to the center point of the proof mass system, each of the first and third sections having a first mass, and each of the second and fourth sections having a second mass, the first mass being greater than the second mass;
a first lever structure connected to each of the first and second sections;
a second lever structure connected to each of the second and third sections;
a third lever structure connected to each of the third and fourth sections; and
a fourth lever structure connected to each of the fourth and first sections, wherein the first, second, third, and fourth lever structures are configured to function cooperatively to enable translational motion of the first, second, third, and fourth sections of the proof mass system in response to a linear acceleration force imposed on the inertial sensor in a direction perpendicular to the planar surface.

2. The inertial sensor of claim 1 further comprising a frame member spaced apart from the planar surface of the substrate, the frame member surrounding the proof mass system, wherein the first and third sections are directly attached to the frame member and the second and fourth sections are detached from the frame member.

3. The inertial sensor of claim 2 wherein:
the first lever structure is interposed between the first and second sections of the proof mass system and a first side of the frame member;
the second lever structure is interposed between the second and third sections of the proof mass system and a second side of the frame member;
the third lever structure is interposed between the third and fourth sections of the proof mass system and a third side of the frame member; and
the fourth lever structure is interposed between the fourth and first sections of the proof mass system and a fourth side of the frame member.

4. The inertial sensor of claim 1 further comprising a rigid beam spaced apart from the planar surface of the substrate and interconnecting the second and fourth sections, wherein the first and third sections are detached from the rigid beam.

5. The inertial sensor of claim 1 wherein:
the first and third lever structures reside across from one another relative to the proof mass system; and
the second and fourth lever structures reside across from one another relative to the proof mass system.

6. The inertial sensor of claim 1 wherein each of the first, second, third, and fourth lever structures comprises:
an anchor coupled to the planar surface of the substrate;
a first spring element;
a pivot beam having a first beam end and a second beam end, the first spring element interconnecting the anchor and a midpoint of the pivot beam, the midpoint being centered between the first and second beam ends;
a second spring element extending from the first beam end of the pivot beam; and
a third spring element extending from the second beam end of the pivot beam.

7. The inertial sensor of claim 6 wherein:
for the first lever structure, the second spring element is interconnected between the first beam end and the first section of the proof mass system and the third spring element is interconnected between the second beam end and the second section of the proof mass system;
for the second lever structure, the second spring element is interconnected between the first beam end and the second section of the proof mass system and the third spring element is interconnected between the second beam end and the third section of the proof mass system;
for the third lever structure, the third spring element is interconnected between the first beam end and the third section of the proof mass system and the third spring element is interconnected between the second beam end and the fourth section of the proof mass system; and
for the fourth lever structure, the second spring element is interconnected between the first beam end and the fourth section of the proof mass system and the third spring element is interconnected between the second beam end and the first section of the proof mass system.

8. The inertial sensor of claim 6 wherein:
each of the first, second, third, and fourth lever structures is oriented substantially parallel to the planar surface of the substrate;
longitudinal dimensions of the first, second, third spring elements are oriented substantially parallel to one another; and
the pivot beam is oriented substantially perpendicular to the longitudinal dimensions of the first, second, and third spring elements.

9. The inertial sensor of claim 6 wherein the first, second, and third spring elements are folded spring elements.

10. The inertial sensor of claim 6 wherein the first, second, and third spring elements are torsion springs configured to pivot about an axis that is substantially parallel to the planar surface.

11. The inertial sensor of claim 1 wherein in response to the linear acceleration force imposed on the inertial sensor in the direction perpendicular to the planar surface, the first, second, third, and fourth lever structures are configured to enable the first and third sections of the proof mass system to undergo the translational motion in anti-phase with the second and fourth sections.

12. The inertial sensor of claim 1 wherein the first, second, third, and fourth lever structures are configured to suppress translational motion of the proof mass system in response to a second linear acceleration forced imposed on the inertial sensor in a direction parallel to the planar surface of the substrate.

13. An inertial sensor comprising:
a proof mass system spaced apart from a planar surface of a substrate, the proof mass system having a first section, a second section, a third section and a fourth section, the third section diagonally opposing the first section relative to a center point of the proof mass system, the fourth section diagonally opposing the second section relative to the center point of the proof mass system, each of the first and third sections having a first mass, and each of the second and fourth sections having a second mass, the first mass being greater than the second mass;
a first lever structure connected to each of the first and second sections;
a second lever structure connected to each of the second and third sections;
a third lever structure connected to each of the third and fourth sections; and
a fourth lever structure connected to each of the fourth and first sections, wherein the first, second, third, and fourth lever structures are configured to function cooperatively to enable translational motion of the first, second, third, and fourth sections of the proof mass system in response to a linear acceleration force imposed on the inertial sensor in a direction perpendicular to the planar surface, and wherein each of the first, second, third, and fourth lever structures comprises:
an anchor coupled to the planar surface of the substrate;
a first folded spring element;
a pivot beam having a first beam end and a second beam end, the first folded spring element interconnecting the anchor and a midpoint of the pivot beam, the midpoint being centered between the first and second beam ends;
a second folded spring element extending from the first beam end of the pivot beam; and
a third folded spring element extending from the second beam end of the pivot beam, each of the first, second, and third folded spring elements being torsion springs configured to pivot about an axis that is substantially parallel to the planar surface.

14. The inertial sensor of claim 13 wherein:
for the first lever structure, the second folded spring element is interconnected between the first beam end and the first section of the proof mass system and the third folded spring element is interconnected between the second beam end and the second section of the proof mass system;
for the second lever structure, the second folded spring element is interconnected between the first beam end and the second section of the proof mass system and the third folded spring element is interconnected between the second beam end and the third section of the proof mass system;
for the third lever structure, the third folded spring element is interconnected between the first beam end and the third section of the proof mass system and the third folded spring element is interconnected between the second beam end and the fourth section of the proof mass system; and
for the fourth lever structure, the second folded spring element is interconnected between the first beam end and the fourth section of the proof mass system and the third folded spring element is interconnected between the second beam end and the first section of the proof mass system.

15. The inertial sensor of claim 13 wherein:
each of the first, second, third, and fourth lever structures is oriented substantially parallel to the planar surface of the substrate;
longitudinal dimensions of the first, second, third folded spring elements are oriented substantially parallel to one another; and
the pivot beam is oriented substantially perpendicular to the longitudinal dimensions of the first, second, and third folded spring elements.

16. The inertial sensor of claim 13 wherein in response to the linear acceleration force imposed on the inertial sensor in the direction perpendicular to the planar surface, the first, second, third, and fourth lever structures are configured to enable the first and third sections of the proof mass system to undergo the translational motion in anti-phase with the second and fourth sections.

17. An inertial sensor comprising:
a proof mass system spaced apart from a planar surface of a substrate, the proof mass system having a first section, a second section, a third section and a fourth section, the third section diagonally opposing the first section relative to a center point of the proof mass system, the fourth section diagonally opposing the second section relative to the center point of the proof mass system, each of the first and third sections having a first mass, and each of the second and fourth sections having a second mass, the first mass being greater than the second mass;
a first lever structure connected to each of the first and second sections;
a second lever structure connected to each of the second and third sections;
a third lever structure connected to each of the third and fourth sections; and
a fourth lever structure connected to each of the fourth and first sections, wherein:
the first, second, third, and fourth lever structures are configured to function cooperatively to enable translational motion of the first, second, third, and fourth sections of the proof mass system in response to a first linear acceleration force imposed on the inertial sensor in a direction perpendicular to the planar surface;
the first, second, third, and fourth lever structures are configured to enable the first and third sections of the proof mass system to undergo the translational motion in anti-phase with the second and fourth sections in response to the first linear acceleration force; and
the first, second, third, and fourth lever structures are configured to suppress translational motion of the proof mass system in response to a second linear acceleration forced imposed on the inertial sensor in a direction parallel to the planar surface of the substrate.

18. The inertial sensor of claim 17 further comprising:
a frame member spaced apart from the planar surface of the substrate, the frame member surrounding the proof mass system, wherein the first and third sections are directly attached to the frame member and the second and fourth sections are detached from the frame member; and
a rigid beam spaced apart from the planar surface of the substrate and interconnecting the second and fourth sections, wherein the first and third sections are detached from the rigid beam.

19. The inertial sensor of claim 17 wherein each of the first, second, third, and fourth lever structures comprises:
an anchor coupled to the planar surface of the substrate;
a first spring element;
a pivot beam having a first beam end and a second beam end, the first spring element interconnecting the anchor and a midpoint of the pivot beam, the midpoint being centered between the first and second beam ends;
a second spring element extending from the first beam end of the pivot beam; and a third spring element extending from the second beam end of the pivot beam.

20. The inertial sensor of claim 19 wherein:

for the first lever structure, the second spring element is interconnected between the first beam end and the first section of the proof mass system and the third spring element is interconnected between the second beam end and the second section of the proof mass system;

for the second lever structure, the second spring element is interconnected between the first beam end and the second section of the proof mass system and the third spring element is interconnected between the second beam end and the third section of the proof mass system;

for the third lever structure, the third spring element is interconnected between the first beam end and the third section of the proof mass system and the third spring element is interconnected between the second beam end and the fourth section of the proof mass system; and for the fourth lever structure, the second spring element is interconnected between the first beam end and the fourth section of the proof mass system and the third spring element is interconnected between the second beam end and the first section of the proof mass system.

* * * * *